US012409671B2

(12) United States Patent
Yamaguchi et al.

(10) Patent No.: US 12,409,671 B2
(45) Date of Patent: Sep. 9, 2025

(54) IMAGE RECORDING APPARATUS

(71) Applicant: BROTHER KOGYO KABUSHIKI KAISHA, Nagoya (JP)

(72) Inventors: Masatomo Yamaguchi, Inazawa (JP); Hideaki Yoshimune, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 86 days.

(21) Appl. No.: 18/180,220

(22) Filed: Mar. 8, 2023

(65) Prior Publication Data

US 2023/0286300 A1 Sep. 14, 2023

(30) Foreign Application Priority Data

Mar. 11, 2022 (JP) ................................ 2022-038068

(51) Int. Cl.
*B41J 11/70* (2006.01)
*B26D 1/04* (2006.01)
*B26D 1/157* (2006.01)
*B26D 5/00* (2006.01)
*B26D 11/00* (2006.01)

(52) U.S. Cl.
CPC .............. *B41J 11/70* (2013.01); *B41J 11/706* (2013.01); *B26D 1/045* (2013.01); *B26D 1/1575* (2013.01); *B26D 5/00* (2013.01); *B26D 11/00* (2013.01)

(58) Field of Classification Search
CPC ......... B41J 11/70; B41J 11/706; B26D 1/045; B26D 1/1575; B26D 5/00; B26D 11/00
See application file for complete search history.

(56) References Cited

U.S. PATENT DOCUMENTS

2014/0043409 A1* 2/2014 Suzuki ................ B41J 2/17509 347/86
2019/0030923 A1* 1/2019 Sudo ..................... B26D 1/085

FOREIGN PATENT DOCUMENTS

JP 2001-71293 A 3/2001
JP 2001071293 A * 3/2001 ............... B26D 1/18
JP 2004268225 A * 9/2004 ............... B26D 1/18
JP 2013-86235 A 5/2013

* cited by examiner

*Primary Examiner* — Yaovi M Ameh
(74) *Attorney, Agent, or Firm* — Merchant & Gould P.C.

(57) ABSTRACT

An image recording apparatus includes a conveyer configured to convey a sheet-like medium in a conveying direction along a conveying path, a recorder configured to record an image on the sheet-like medium conveyed by the conveyer, a cutter unit including a cutter and configured to cut the sheet-like medium in the conveying path, a carriage to which the cutter unit is detachably attached, and a lever swingably attached to the carriage. The lever is configured to swing between a fixing position for fixing the cutter unit to the carriage and a releasing position for releasing the fixing of cutter unit to the carriage.

15 Claims, 14 Drawing Sheets

IMAGE RECORDING APPARATUS

REFERENCE TO RELATED APPLICATIONS

This application claims priority from Japanese Patent Application No. 2022-038068 filed on Mar. 11, 2022. The entire content of the priority application is incorporated herein by reference.

BACKGROUND ART

Aspects of the present disclosure relate to an image recording apparatus including a cutter configured to cut a sheet-like medium.

There is known an image recording apparatus configured to record an image while conveying a long sheet-like medium such as sheet, cloth, or labels along a conveying path. Such image recording apparatus may include a cutter configured to cut the sheet-like medium. The cutter is preferably replaceable because the cutting ability may degrade due to adhesion of glue of labels on the cutter or wear of the cutter.

There is known an image recording apparatus which is configured such that the cutter can be replaced together with a cutter holder by configuring the cutter holder, in which the cutter is housed, to be detachable from a cutter base. The cutter holder is fixed to the cutter base by a fixing member such as a screw or a bolt. The cutter holder can be removed from the cutter base by releasing the fixing of the cutter holder by the fixing member.

DESCRIPTION

In the above-mentioned configuration, when attaching or detaching the cutter holder (i.e., a cutter unit) from the cutter base (i.e., a carriage), it is necessary to perform a complicated operation of releasing the fixing of the cutter holder or re-fixing the cutter holder by rotating a fixing member such as a screw or a bolt.

At least one aspect of the present disclosure is advantageous to provide an image recording apparatus in which the cutter unit can be easily attached to and detached from the carriage.

According to aspects of the present disclosure, there is provided an image recording apparatus including a conveyer configured to convey a sheet-like medium in a conveying direction along a conveying path, a recorder configured to record an image on the sheet-like medium conveyed by the conveyer, a cutter unit including a cutter and configured to cut the sheet-like medium in the conveying path, a carriage to which the cutter unit is detachably attached, and a lever swingably attached to the carriage. The lever is configured to swing between a fixing position for fixing the cutter unit to the carriage and a releasing position for releasing the fixing of cutter unit to the carriage.

EMBODIMENT

Figure 1:
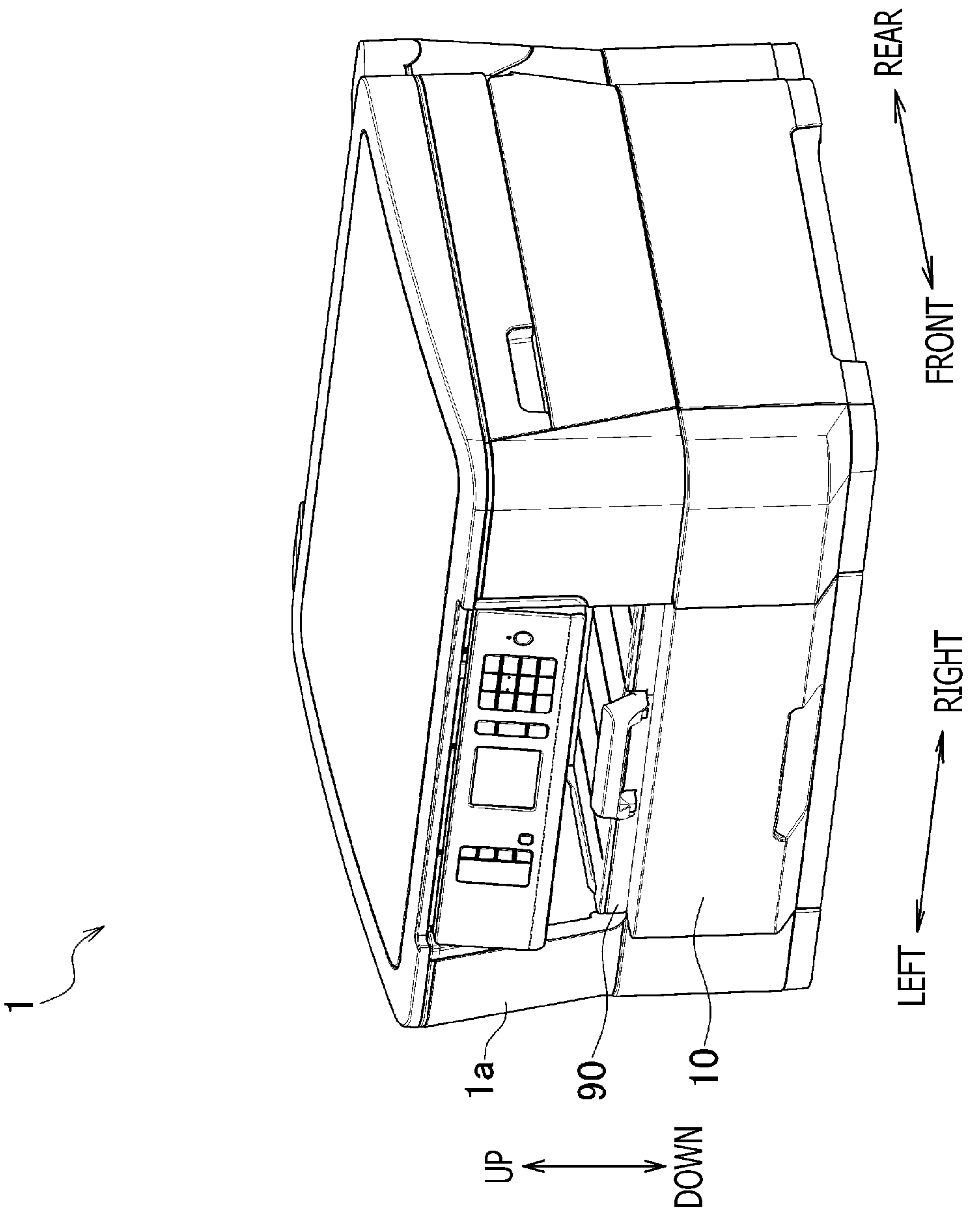
FIG. 1 is a perspective view of a printer.

As shown in FIG. 1, a printer 1 (image recording apparatus) according to an embodiment of the present disclosure includes a housing 1*a*, a sheet feed tray 10 removable from the housing 1*a*, and a sheet discharge tray 90.

Figure 2:
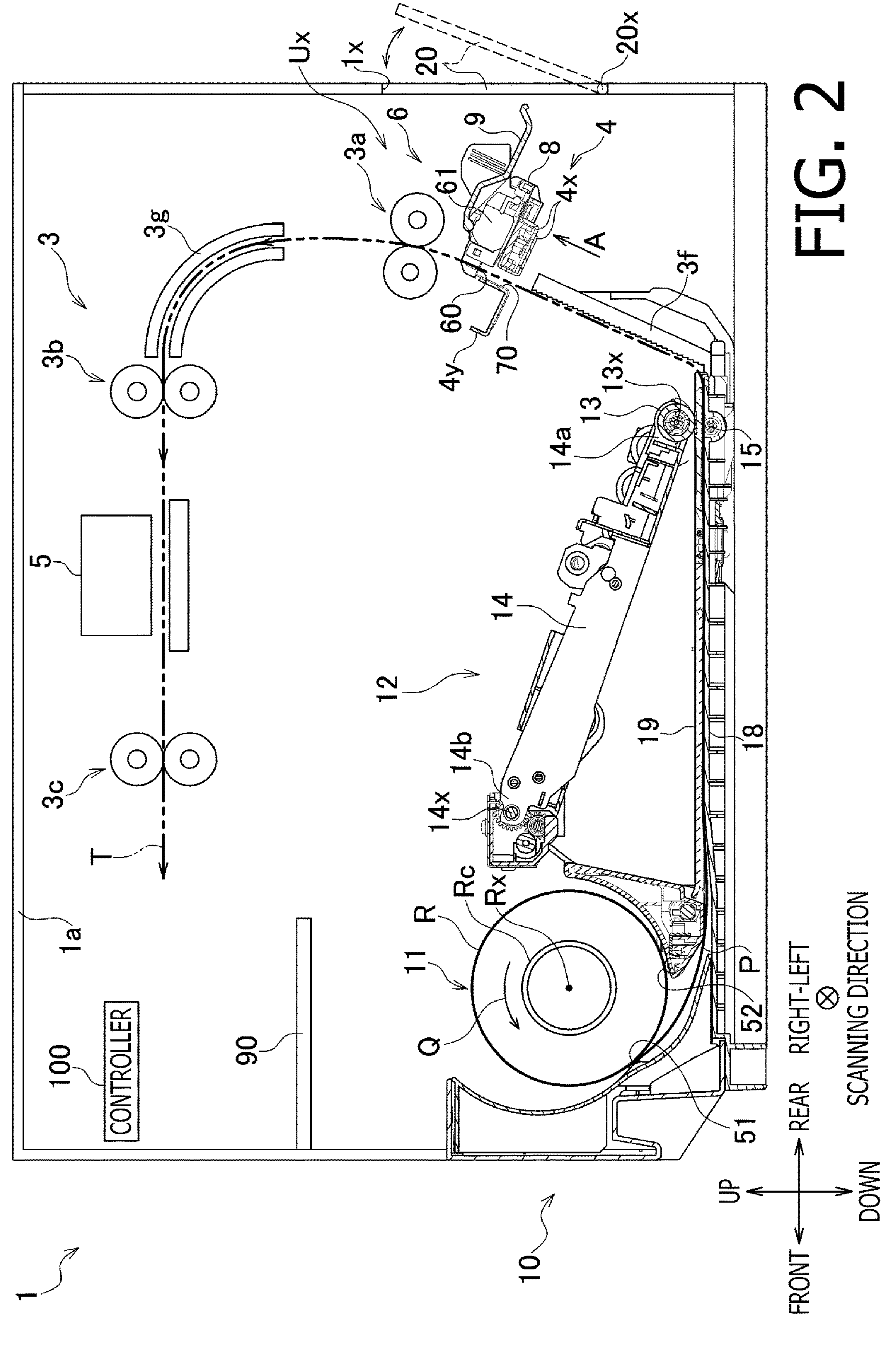
FIG. 2 is a schematic side view showing an internal structure of the printer.

As shown in FIG. 2, the printer 1 further includes a conveyer 3, a head 5, a cutter unit 6, a scanning mechanism 4, and a controller 100. Elements of the conveyer 3 other than rollers 51 and 52 described later, the head 5, the cutter unit 6, the scanning mechanism 4, and the controller 100 are supported by the housing 1*a*. The rollers 51 and 52 are supported by the sheet feed tray 10.

The conveyer 3 is configured to convey the sheet P along a conveying path T in a conveying direction. The conveyer 3 includes rollers 51 and 52, a roller 13, an arm 14, roller pairs 3*a*-3*c*, a separating member 3*f*, a pair of guide members 3*g*, and a conveying motor 3*x* (see FIG. 10) configured to drive the rollers.

The conveying path T is a path that extends from the sheet feed tray 10 to the sheet discharge tray 90 while passing between the pair of guide members 3*g* and under the head 5. The conveying path T includes a U-shaped part at a portion upstream of the head 5 in the conveying direction. The separating member 3*f*, the cutter unit 6, the roller pair 3*a*, and the pair of guide members 3*g* are disposed in the U-shaped part. The cutter unit 6 and the roller pair 3*a* are disposed at a bottom portion Ux of the U-shaped part. The cutter unit 6 is disposed downstream of the separating member 3*f* in the conveying direction and upstream of the roller pair 3*a* in the conveying direction.

The sheet feed tray 10 includes a roll sheet accommodating part 11 configured to accommodate a roll sheet R, and a cut sheet accommodating part 12 configured to accommodate a plurality of cut sheets (not shown) stacked in the up-down direction. The cut sheets accommodated in the cut sheet accommodating part 12 is supported by an upper surface of a support plate 19 disposed along a bottom plate 18 of the sheet feed tray 10. The cut sheets are removed from the cut sheet accommodating part 12 when using the roll sheet R (see FIG. 2), and the roll sheet R is removed from the roll sheet accommodating part 11 when using the cut sheets.

In the present disclosure, the sheet P is used as a general term for sheet unwound from the roll sheet R and the cut sheet. The cut sheet is a sheet having a length along the conveying path T shorter than that of the sheet constituting the roll sheet R.

The roll sheet R is formed by winding a long sheet P in a roll shape on an outer peripheral surface of a cylindrical core member Rc. The roll sheet R is accommodated in the roll sheet accommodating part 11 with its rotation axis Rx (a center axis of the core member Rc) extending in the right-left direction.

The rollers 51 and 52 are disposed at the bottom of the roll sheet accommodating part 11. The rollers 51 and 52 are rotatable about respective axes extending in the right-left direction. When the roll sheet R is accommodated in the roll sheet accommodating part 11, an outer peripheral surface of a lower portion of the roll sheet R is supported by the rollers 51 and 52. When setting the roll sheet R, the roll sheet R is manually rotated in a direction indicated by an arrow Q in FIG. 2 to unroll the sheet P from the roll sheet R. Then, the sheet P is made to pass through a gap between a lower surface of the support plate 19 and an upper surface of the bottom plate 18, and a leading edge of the sheet P is nipped between the roller 13 and the roller 15. In this state, when the conveying motor 3*x* (see FIG. 10) is driven under the control of the controller 100 and the rollers 51, 52 and 13 rotate, the sheet P unrolled from the roll sheet R is fed backward.

The roller 13 is supported by one end 14*a* of the arm 14 and is rotatable about a shaft 13*x* extending in the right-left direction. The other end 14*b* of the arm 14 is supported by the housing 1*a* via a shaft 14*x* extending in the right-left direction. The arm 14 is swingable about the shaft 14*x* with the other end 14*b* as a fulcrum.

In a state where the sheet feed tray 10 is mounted to the housing 1*a*, when no cut sheet is accommodated in the cut sheet accommodating part 12, the roller 13 comes into contact with the upper surface of the support plate 19 (see FIG. 2). In a state where the sheet feed tray 10 is mounted to the housing 1*a*, when one or more cut sheets are accommodated in the cut sheet accommodating part 12, the roller 13 comes into contact with the uppermost cut sheet among the cut sheets accommodated in the cut sheet accommodating part 12. In this state, the cut sheet is fed backward as the conveying motor 3*x* (see FIG. 10) is driven under the control of the controller 100 and the roller 13 rotates.

The sheet P fed from the sheet feed tray 10 by the roller 13 (i.e., the sheet unwound from the roll sheet R accommodated in the roll sheet accommodating part 11 or the cut sheet accommodated in the cut sheet accommodating part 12) comes into contact with the separating member 3*f*, moves along the separating member 3*f*, and is guided toward the roller pair 3*a*.

The separating member 3*f* is disposed behind the roller 13 and extends in an oblique direction intersecting both the up-down direction and the front-rear direction. On a surface of the separating member 3*f*, fine irregularities repeating along the conveying path T are formed. The irregularities prevent double conveyance (i.e., a phenomenon in which a plurality of cut sheets are conveyed in an overlapped state). In other words, the separating member 3*f* has a function of separating the cut sheet in contact with the roller 13 from the other cut sheets.

Figure 10:
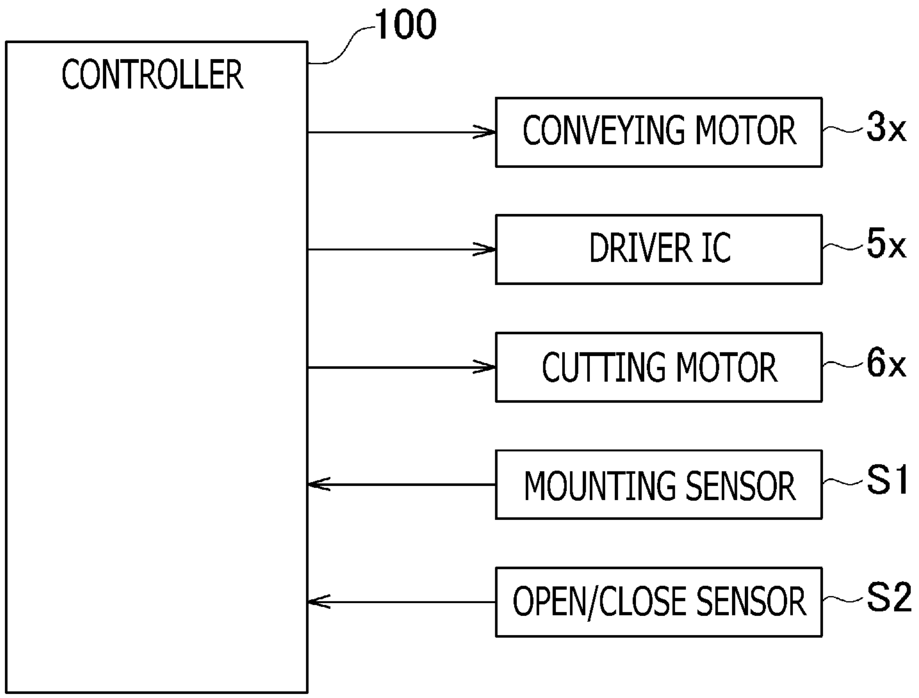
FIG. 10 is a block diagram showing an electrical configuration of the printer.

The head 5 includes a plurality of conventionally-known nozzles formed on a lower surface of the head 5, and a driver IC 5*x* (see FIG. 10). When the sheet P conveyed by the conveyer 3 passes through a position facing the lower surface of the head 5, the driver IC 5*x* is driven under the control of the controller 100, so that ink is ejected from the nozzles and lands on the sheet P, and an image is recorded on the sheet P. The head 5 may be of either a line type that ejects ink from the nozzles while the position is fixed or a serial type that ejects ink from the nozzles while moving in the right-left direction.

The cutter unit 6 is configured to cut the sheet P unwound from the roll sheet R between the separating member 3*f* and the roller pair 3*a* in the conveying path T. The cutter unit 6 includes a cutter 60, and a holder 61 configured to hold the cutter 60. The cutter unit 6 is detachably attached to the carriage 8.

The carriage 8 can be made to reciprocate in a scanning direction (right-left direction) by the scanning mechanism 4. The scanning direction is parallel to the sheet P lying along the conveying path T and intersects a conveying direction A (See FIG. 2. A conveying direction in the vicinity of the cutter unit 6).

Figure 3:
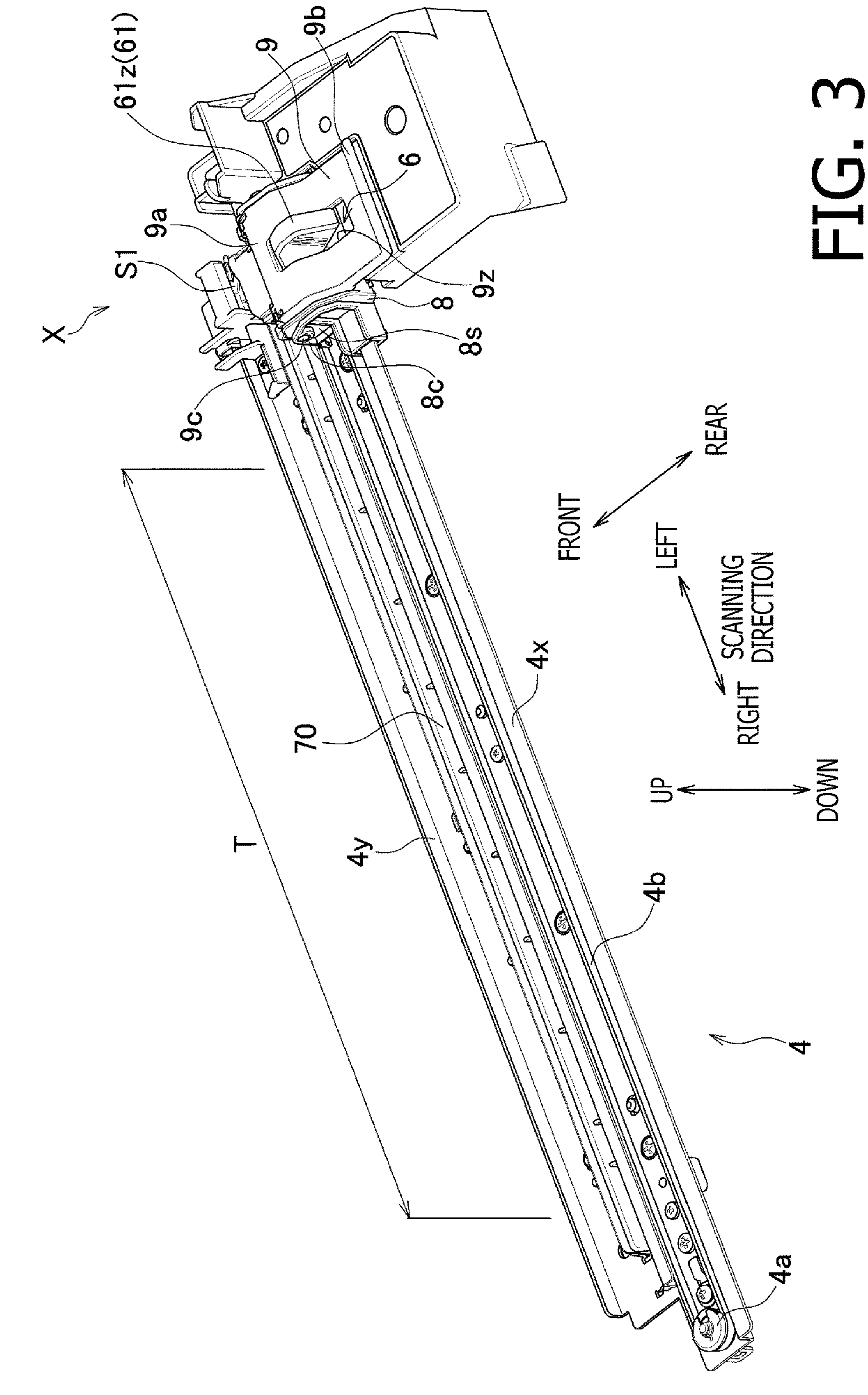
FIG. 3 is a perspective view of a cutter unit and a scanning mechanism of the printer.

As shown in FIG. 3, the scanning mechanism 4 includes a guide rail 4*x* extending in the scanning direction, a pair of pulleys 4*a* (only one of which is shown in FIG. 3) disposed to be spaced apart from each other in the scanning direction, a belt 4*b* wound around the pair of pulleys 4*a* and having the carriage 8 fixed thereto, and a cutting motor 6*x* (see FIG. 10). The pair of pulleys 4*a* and the belt 4*b* are attached to the guide rail 4*x*. The guide rail 4*x* supports the carriage 8 fixed to the belt 4*b* and the cutter unit 6 mounted on the carriage 8.

Another guide rail 4*y* is disposed in front of the guide rail 4*x* at a position opposing the guide rail 4*x* across a conveying path T (see FIG. 2). The guide rail 4*y* extends in the scanning direction and is disposed to be spaced apart from the guide rail 4*x* with a small gap in the front-rear direction. The conveying path T is formed in the gap.

Another cutter 70 is attached to the guide rail 4*y*. As shown in FIG. 4, the cutter 70 is L-shaped and has a portion 71 that covers a lower surface of the guide rail 4*y* and a portion 72 that covers a side surface of the guide rail 4*y* that defines the conveying path T. The portion 72 of the cutter 70 extends along the conveying path T. The cutter 70 has a blade 70*a* at an end portion of the portion 72 on the downstream side in the conveying direction A.

While the cutter 70 is fixed, the cutter 60 included in the cutter unit 6 rotates. The cutter 60 is disk-shaped and has a blade 60*a* at its peripheral edge. When cutting the sheet P, the blade 60*a* of the cutter 60 extends in a direction intersecting the sheet P lying along the conveying path T downstream of the blade 70*a* of the cutter 70 in the conveying direction A, and overlaps with the blade 70*a* of the cutter 70 in the conveying direction A.

When the cutting motor 6*x* is driven under the control of the controller 100, the belt 4*b* travels in the scanning direction, and the carriage 8 and the cutter unit 6 attached to the carriage 8 move from an attaching/detaching position X outside the conveying path T into the conveying path T (see FIG. 3). At this time, the cutter 60 rotates by the driving of the cutting motor 6*x*. The sheet P unwound from the roll sheet R is cut in a width direction of the sheet P by the fixed cutter 70 and the cutter 60 rotating while moving in the scanning direction.

The attaching/detaching position X is at left ends of the guide rails 4*x* and 4*y*, which is a home position of the movement of the carriage 8 as described above, and is also a position for attaching/detaching the cutter unit 6 to/from the carriage 8. At the attaching/detaching position X, there is provided a mounting sensor S1. The mounting sensor S1 is electrically connected to a controller 100 (see FIG. 10). when the cutter unit 6 is mounted to the carriage 8 at the attaching/detaching position X, the mounting sensor S1 contacts the cutter unit 6 and outputs an ON signal to the controller 100, and when the cutter unit 6 is detached from the carriage 8 at the attaching/detaching position X, the mounting sensor S1 separates from the cutter unit 6 and outputs an OFF signal to the controller 100. When performing recording using the roll sheet R, the controller 100 controls the conveying motor 3*x*, the driver IC 5*x*, and the cutting motor 6*x* to execute a recording process of recording an image on the sheet P when the ON signal is received from the mounting sensor S1.

An opening 1*x* (see FIG. 2) is formed to a rear wall of the housing 1*a*. Through the opening 1*x*, a portion inside the housing 1*a* including the attaching/detaching position X (the carriage 8 at the attaching/detaching position X) is exposed to the outside of the housing 1*a*. The opening 1*x* is formed at a portion of the housing 1*a* facing the bottom portion Ux of the above-described U-shaped portion.

A cover 20 configured to cover the opening 1*x* is attached to the rear wall of the housing 1*a*. The cover 20 is swingable about a shaft 20*x* provided at a lower end of the opening 1*x* and extending along the right-left direction, and can move between a closed position for closing the opening 1*x* (see the solid line in FIG. 2) and an open position for opening the opening 1*x* (see the broken line in FIG. 2) by swinging about the shaft 20*x*.

By positioning the cover 20 at the open position (see the broken line in FIG. 2), the cutter unit 6 can be attached to and detached from the carriage 8 at the attaching/detaching position X through the opening 1*x*.

An open/close sensor S2 (see FIG. 10) is provided to the housing 1*a* near the opening 1*x*. The open/close sensor S2 is electrically connected to the controller 100. The open/close sensor S2 outputs an ON signal to the controller 100 when the cover 20 is at the closed position, and outputs an OFF signal to the controller 100 when the cover 20 is at the open position. When performing recording using the roll sheet R, the controller 100 controls the conveying motor 3*x*, the driver IC 5*x*, and the cutting motor 6*x* to execute the recording process when the ON signal is received from the open/close sensor S2.

Next, the configuration of the cutter unit 6 and the carriage 8 will be described in detail.

Figure 7:
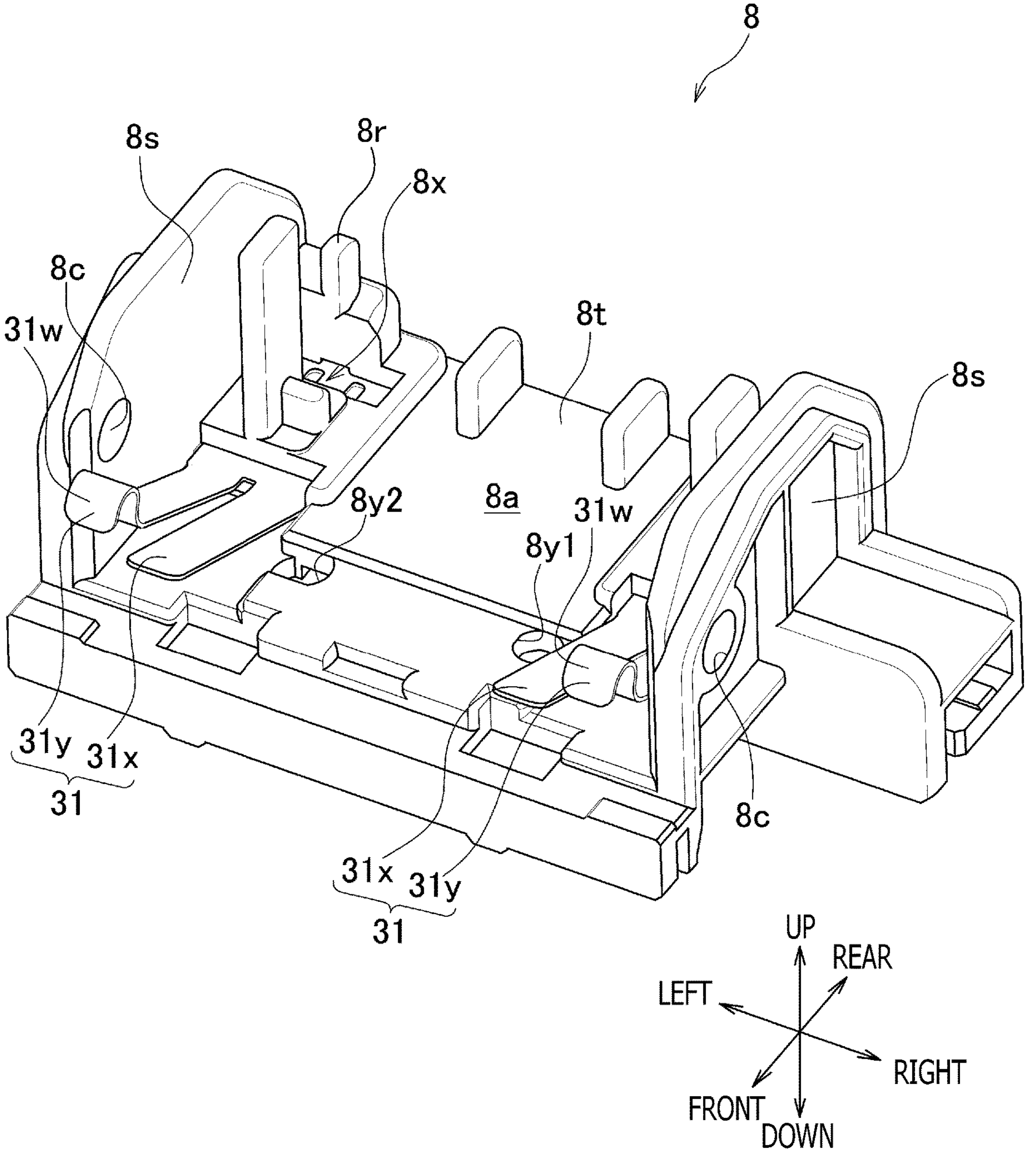
FIG. 7 is a perspective view showing a carriage.

As shown in FIG. 7, the carriage 8 has a bottom wall 8*t*, and a pair of side walls 8*s* disposed to be spaced apart from each other in the right-left direction. The cutter unit 6 is disposed between the pair of side walls 8*s*, and the cutter unit 6 is supported by a support surface 8*a* which is an upper surface of the bottom wall 8*t*. A pair of leaf springs 31 disposed to be spaced apart from each other in the right-left direction are attached to the support surface 8*a*. Each of the pair of leaf springs 31 includes a first portion 31*x* linearly extending from a base end to a front end, and a second portion 31*y* having a curved portion 31*w* convex upward at a front end. A front end of the cutter unit 6 is supported by the first portion 31*x* (see FIG. 4).

As shown in FIGS. 4A, 4B, 6 and 7, the carriage 8 further includes a recess 8*x* in which a projection 61*x* provided at a rear end of the holder 61 is to be disposed, and two holes 8*y*1 and 8*y*2 in which two projections 61*y*1 and 61*y*2 provided at approximately the center of the holder 61 in the front-rear direction are to be inserted, respectively. The recess 8*x* is an example of a "first engaging portion" according to aspects of the present disclosure. The two holes 8*y*1 and 8*y*2 are examples of a "second engaging portion" according to aspects of the present disclosure. The projection 61*x* is engageable with the recess 8*x*, and the projections 61*y*1 and 61*y*2 are engageable with the holes 8*y*1 and 8*y*2, respectively.

Figure 6:
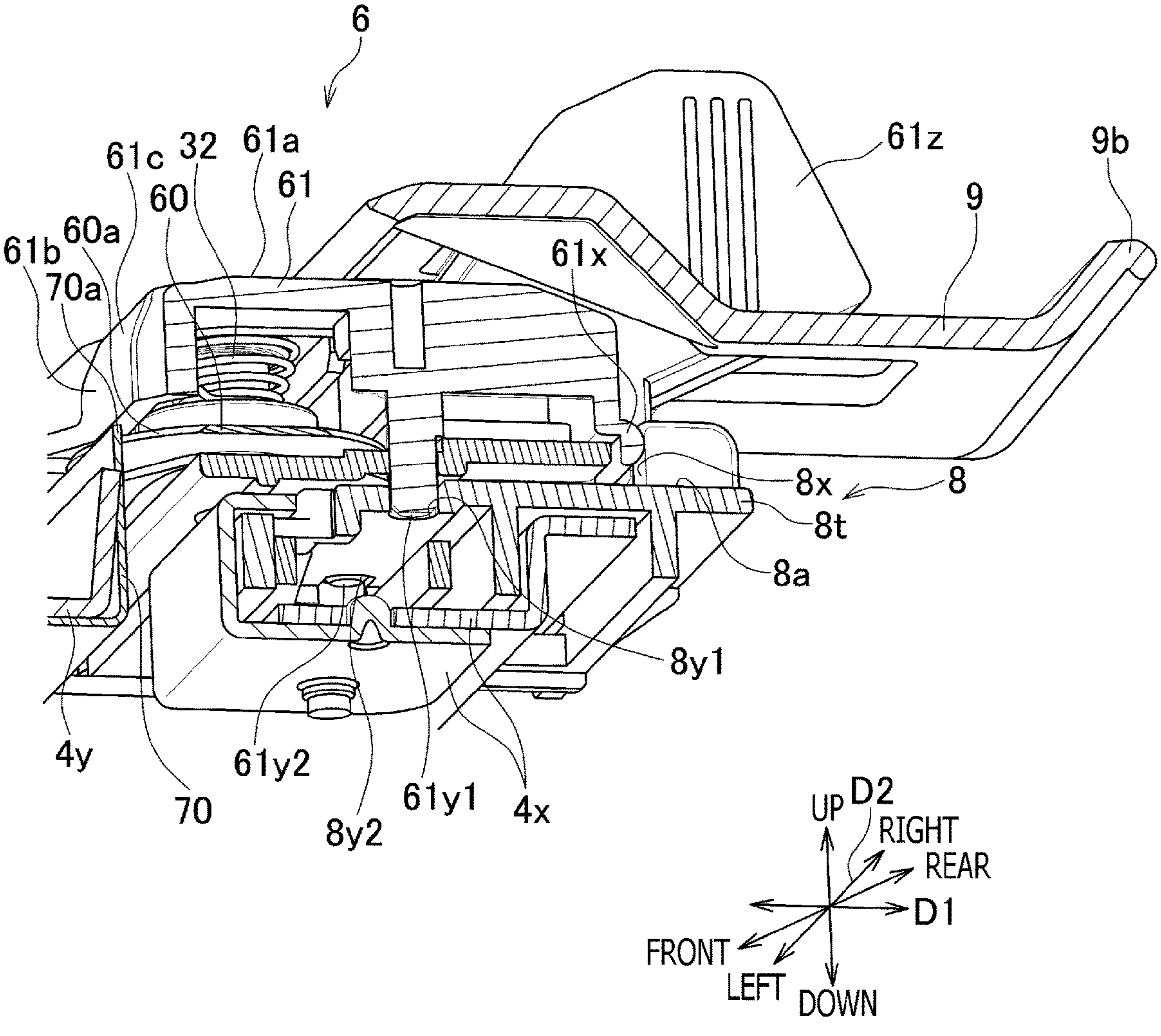
FIG. 6 is a perspective cross-sectional view of the cutter unit, a carriage, and the lever.

As shown in FIG. 6, the recess 8*x* is located behind the two holes 8*y*1 and 8*y*2, and the recess 8*x* and the two holes 8*y*1 and 8*y*2 are spaced apart from each other in a first direction D1 along the support surface 8*a*. The two holes 8*y*1 and 8*y*2 are spaced apart from each other in a second direction D2 (lateral direction) intersecting with the first direction D1 and being along the support surface 8*a*. Similarly, the two projections 61*y*1 and 61*y*2 are spaced apart from each other in the right-left direction.

As shown in FIG. 7, the two holes 8*y*1 and 8*y*2 have different lengths in the right-left direction. The hole 8*y*1 has a substantially regular circular shape, while the hole 8*y*2 has a substantially elliptical shape elongated in the right-left direction, and a length of the hole 8*y*2 in the right-left direction is longer than a length of the hole 8*y*1 in the right-left direction.

When mounting the cutter unit 6 on the carriage 8, first, the cutter unit 6 is inserted between a pair of side walls 8*s* (see FIG. 7) of the carriage 8 to temporarily position the cutter unit 6 in the second direction D2 (right-left direction) with respect to the carriage 8 by the pair of side walls 8*s*. Then, as shown in FIG. 6, the projection 61*x* is inserted in in the recess 8*x*, and then the projections 61*y*1 and 61*y*2 are inserted into the holes 8*y*1, 8*y*2, respectively, so as to position the cutter unit 6 in the first direction D1 and the second direction D2 with respect to the carriage 8. The user can perform the above mounting operation while holding a handle 61*z* provided at a rear end of the holder 61.

As shown in FIG. 6, the cutter unit 6 includes a coil spring 32 configured to bias the cutter 60 downward. By the biasing force of the coil spring 32, a distance between the blade 60*a* of the cutter 60 and the blade 70*a* of the cutter 70 is maintained at a predetermined distance suitable for cutting the sheet P.

Figure 8:
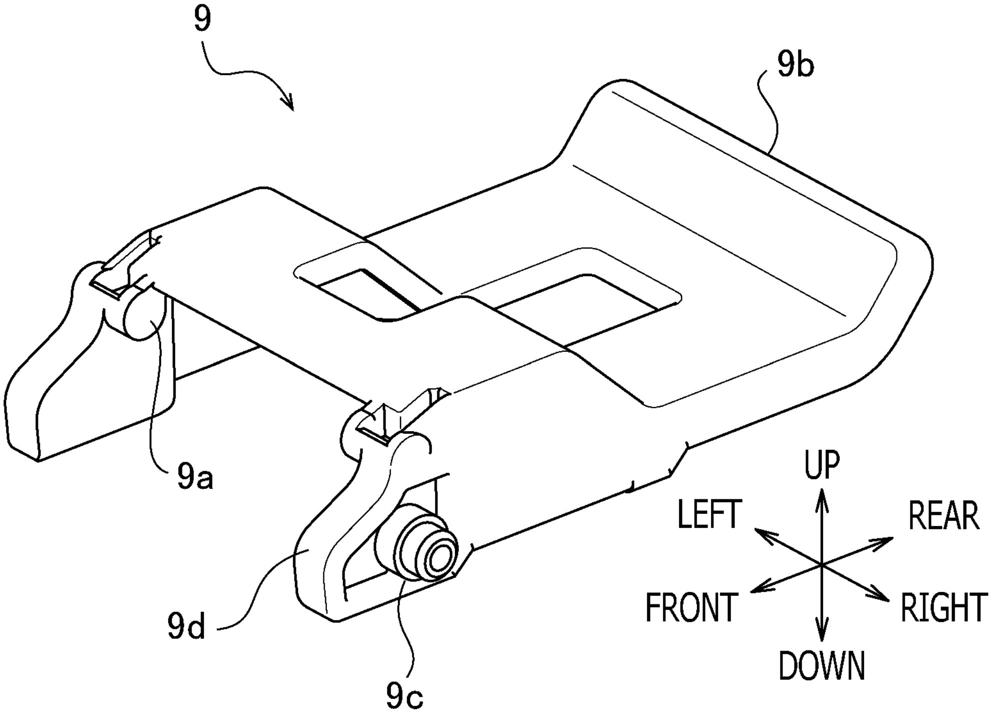
FIG. 8 is a perspective view showing the lever.

In the present embodiment, a lever 9 is provided to facilitate attachment and detachment of the cutter unit 6 to and from the carriage 8. As shown in FIG. 8, the lever 9 includes front ends 9*a*, a rear end 9*b*, shafts 9*c* extending in the right-left direction, and tips 9*d*. The lever 9 is attached to the carriage 8 so as to be swingable about the shafts 9*c*. The shafts 9*c* are inserted into holes 8*c* (see FIGS. 3 and 7) formed to the side walls 8*s* of the carriage 8.

Figure 4A:
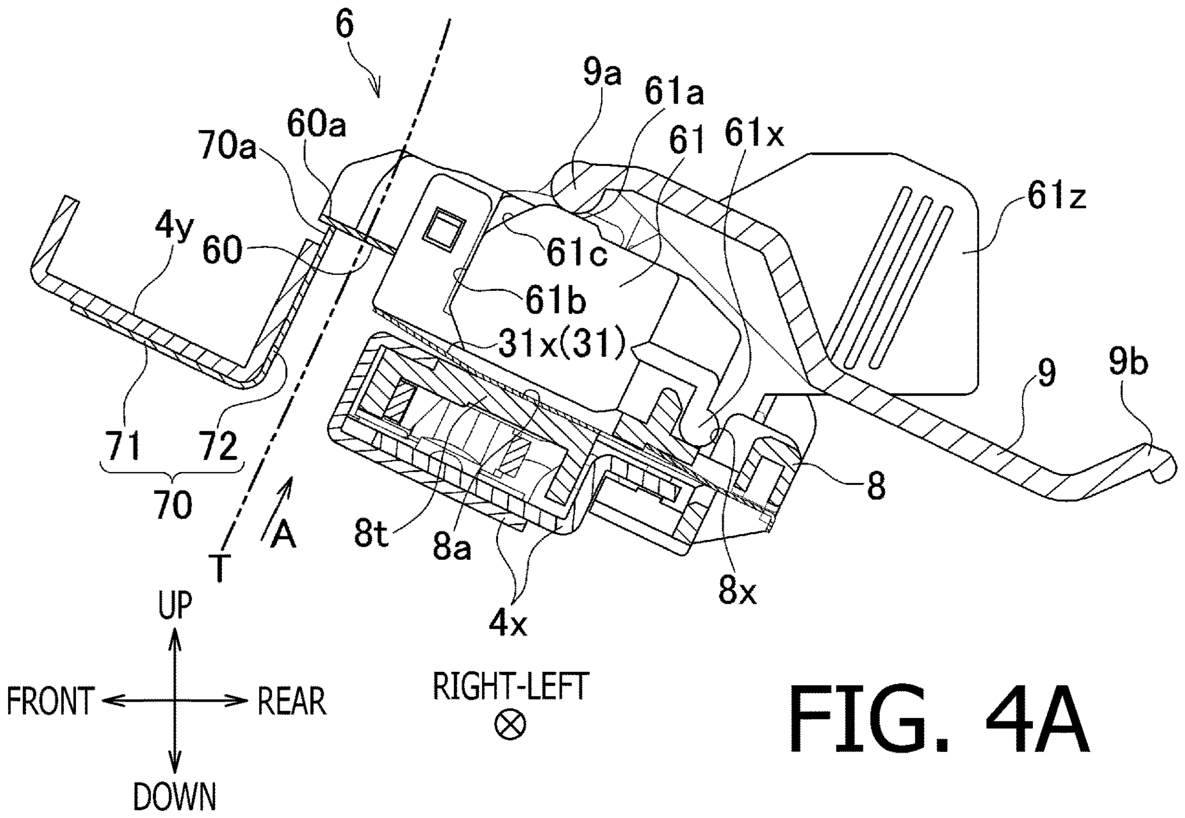
FIG. 4A is a cross-sectional side view showing a state in which a lever is at a fixing position.
Figure 4B:
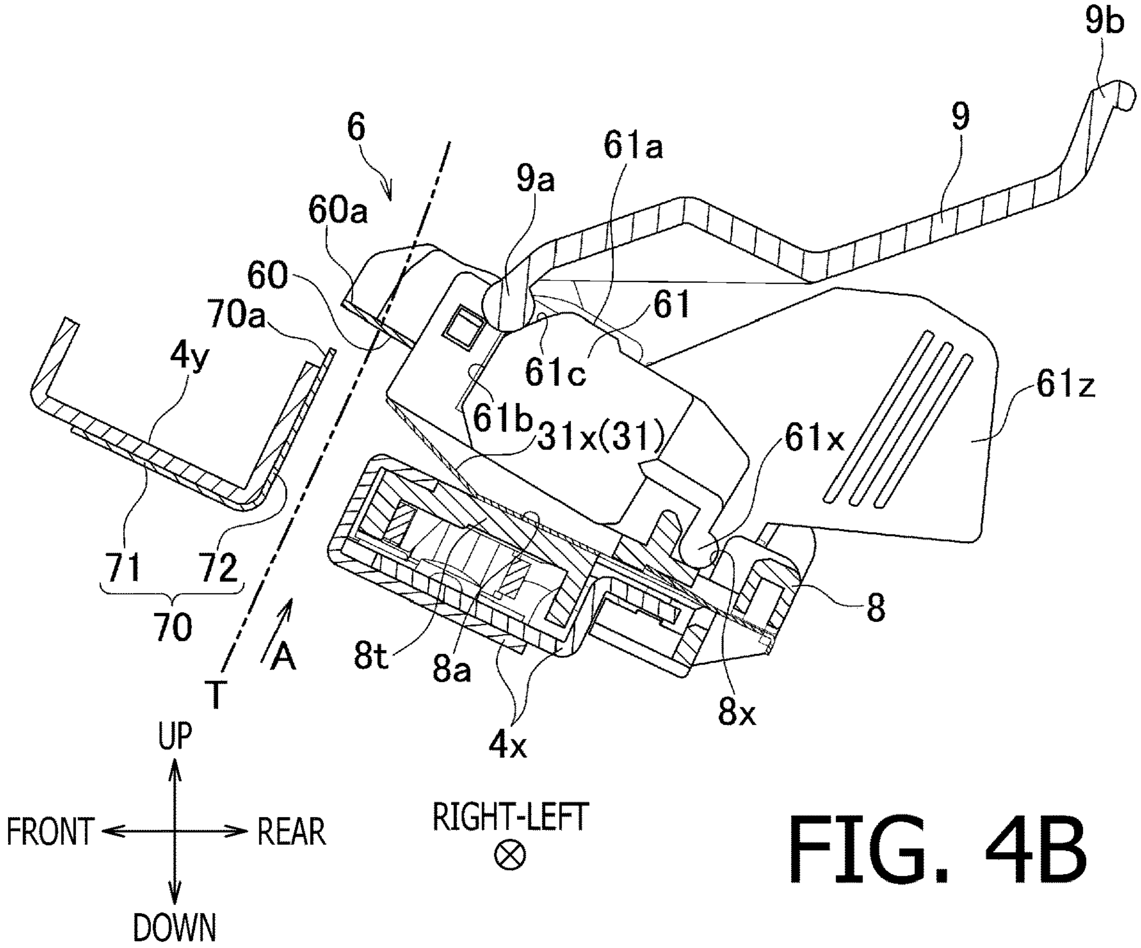
FIG. 4B is a cross-sectional side view showing a state in which the lever is at a releasing position.

By swinging about the shafts 9*c*, the lever 9 can move between a fixing position for fixing the cutter unit 6 with respect to the carriage 8 (see FIG. 4A) and a releasing position for releasing the cutter unit 6 from the carriage 8 (see FIG. 4B).

When mounting the cutter unit 6 on the carriage 8, the lever 9 is moved to the releasing position (see FIG. 4B) first, and the above-described mounting operation is performed. When the cutter unit 6 is mounted on the carriage 8 with the lever 9 at the releasing position, a front end portion of the cutter unit 6 is lifted upward by urging force of the first portions 31*x* of the leaf springs 31, so that the blade 60*a* of the cutter 60 moves away from the blade 70*a* of the cutter 70 toward the downstream side in the conveying direction A. That is, the first portions 31*x* of the leaf springs 31 urge the cutter unit 6 in a direction in which the blade 60*a* of the cutter 60 moves away from the blade 70*a* of the cutter 70 toward the downstream side in the conveying direction A. At this time, the front ends 9*a* of the lever 9 are in contact with an inclined surface 61*c* formed at a boundary between an upper surface 61*a* and a front surface 61*b* of the holder 61.

Figure 5A:
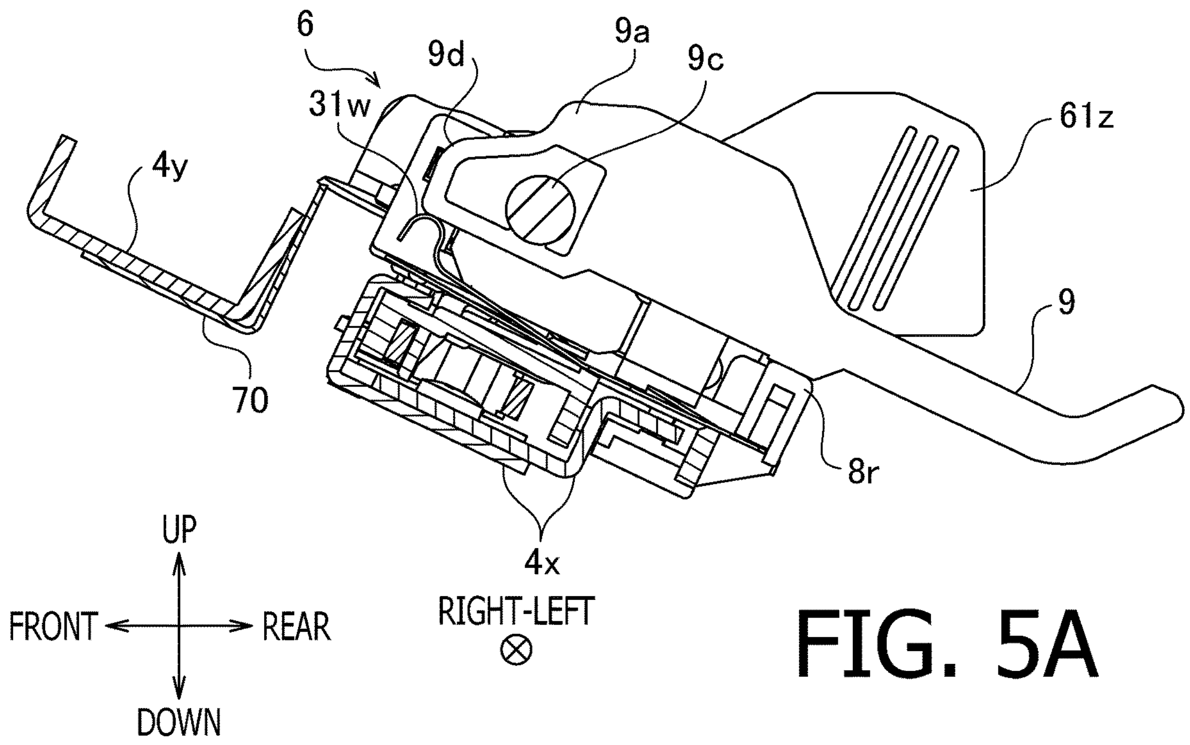
FIG. 5A is another cross-sectional side view showing the state in which the lever is at the fixing position.
Figure 5B:
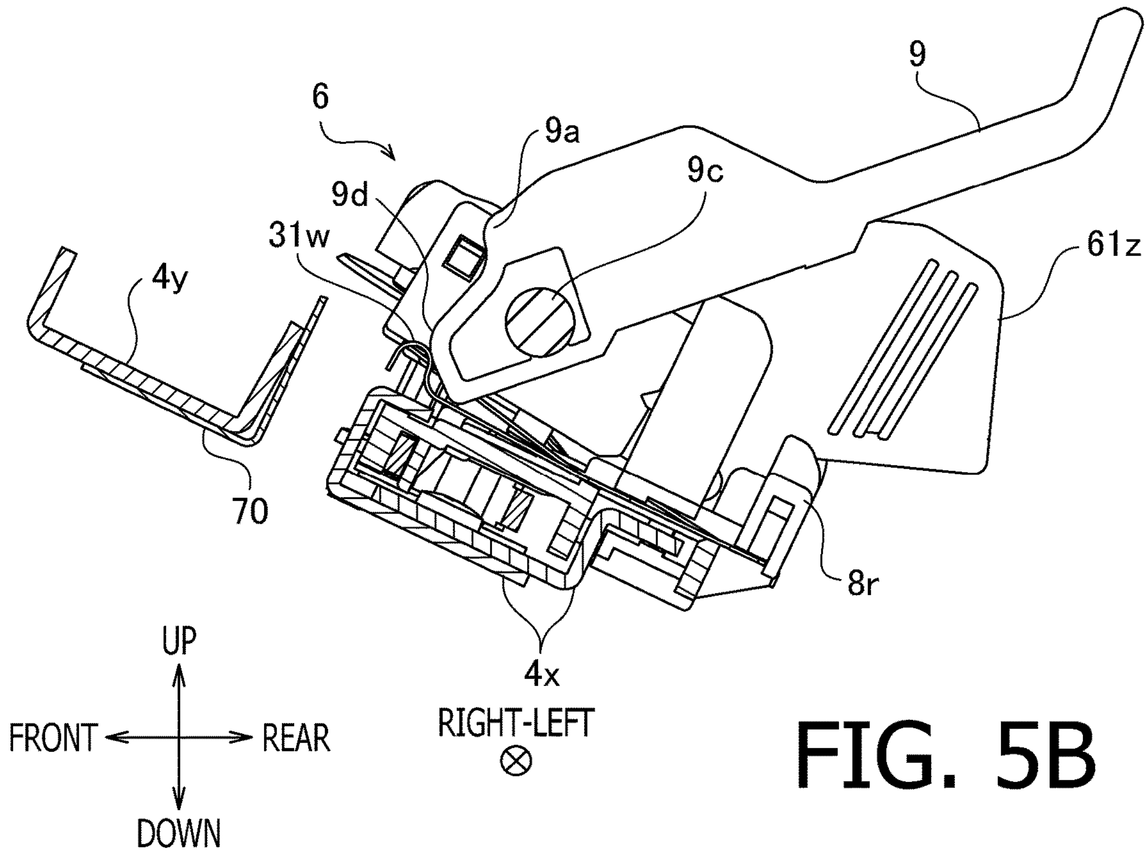
FIG. 5B is another cross-sectional side view showing the state in which the lever is at the releasing position.

Then, by pushing down the rear end 9*b* of the lever 9, the lever 9 is moved from the releasing position (see FIG. 4B) to the fixing position (see FIG. 4A). At this time, since the front ends 9*a* of the lever 9 are formed at portions of the lever 9 away from an axis of the shafts 9*c* which is a swing center of the lever 9 as shown in FIGS. 5A, 5B and 8, the front ends 9*a* move clockwise in FIGS. 5A and 5B about the axis of the shafts 9*c*. Consequently, as shown in FIGS. 4A and 4B, the front ends 9*a* of the lever 9 move along the inclined surface 61*c* of the holder 61 and reach the upper surface 61*a* of the holder 61. Accordingly, the front ends 9*a* of the lever 9 press the upper surface 61*a* of the holder 61, and the cutter unit 6 is pressed toward the support surface 8*a* against the biasing forces of the first portions 31*x* of the leaf springs 31 and the coil spring 32 (biasing forces acting in the direction from the support surface 8*a* toward the cutter unit 6). The cutter unit 6 is thus fixed to the carriage 8. At this time, the distance between the blade 60*a* of the cutter 60 and the blade 70*a* of the cutter 70 is smaller than the distance when the lever 9 is at the releasing position (see FIG. 4B), and is a predetermined distance suitable for cutting the sheet P.

At the fixing position, as shown in FIG. 5A, the tips 9*d* of the lever 9 are urged upward by the curved portions 31*w* of the leaf springs 31, so that the lever 9 is urged in a direction to swing clockwise in FIG. 4 about the shafts 9*c*, and at the same time, the swinging is restricted by a restricting part 8*r* provided behind the shafts 9*c*. The lever 9 is thus fixed to the carriage 8 in a non-swingable manner, and is held in the fixing position against the urging forces of the first portions 31*x* of the leaf springs 31 and the coil spring 32. In order to move the lever 9 from the fixing position to the releasing position, the rear end 9*b* of the lever 9 is lifted so that each tip 9*d* of the lever 9 moves along a circumferential surface of the corresponding curved portion 31*w* and the lever 9 swings relative to the carriage 8. When each tip 9*d* of the lever 9 is disposed on a rear surface of the curved portion 31*w* as shown in FIG. 5B, the lever 9 is urged by the leaf springs 31 in a direction to swing counterclockwise in FIG. 4 about the shafts 9*c* (that is, in a direction toward the releasing position).

Alternatively, at the fixing position, the lever 9 engages with portions of the side wall 8*s* of the carriage 8 other than the holes 8*c*, so that the lever 9 is fixed to the carriage 8 in a non-swingable manner. The lever 9 is thus held at the fixing position against the biasing forces of the first portions 31*x* of the leaf springs 31 and the coil spring 32. In order to move the lever 9 from the fixing position to the releasing position, the rear end 9*b* of the lever 9 is lifted to release the engagement, and the lever 9 is swung relative to the carriage 8.

As shown in FIG. 3, the lever 9 is formed with a through hole 9*z* into which the handle 61*z* of the cutter unit 6 is to be inserted. When the lever 9 is moved from the releasing position (see FIG. 4B) to the fixing position (see FIG. 4A) with the cutter unit 6 mounted to the carriage 8, the handle 61*z* is inserted into the through hole 9*z*.

When removing the cutter unit 6 from the carriage 8, first, the rear end 9*b* of the lever 9 is lifted to move the lever 9 from the fixing position (see FIG. 4A) to the releasing position (see FIG. 4B). At this time, the front ends 9*a* of the lever 9 move from the upper surface 61*a* to the inclined surface 61*c* of the holder 61. Accordingly, the pressing by the front ends 9*a* of the lever 9 is released, and the front end of the cutter unit 6 moves upward by the urging forces of the first portions 31*x* of the leaf springs 31 in a state where the projection 61*x* at the rear end is disposed in the recess 8*x*. At this time, the cutter 60 moves to the downstream side in the conveying direction A, and the distance between the blade 60*a* of the cutter 60 and the blade 70*a* of the cutter 70 becomes larger than the distance when the lever 9 is at the fixing position (see FIG. 4A).

Then, the cutter unit 6 is slightly lifted up, the projections 61*y*1 and 61*y*2 (see FIG. 6) are removed from the holes 8*y*1 and 8*y*2, and the projection 61*x* is disposed outside the recess 8*x*. Then, the cutter unit 6 is removed from the carriage 8 by moving the cutter unit 6 backward and pulling out the cutter unit 6 from the pair of side walls 8*s* (see FIG. 7) of the carriage 8. A user can perform the removal operation described above while holding the handle 61*z* provided at the rear end of the holder 61.

The operation of attaching and detaching the cutter unit 6 to and from the carriage 8 as described above is performed while the cover 20 is held at the open position (see the broken line in FIG. 2).

Figure 9C:
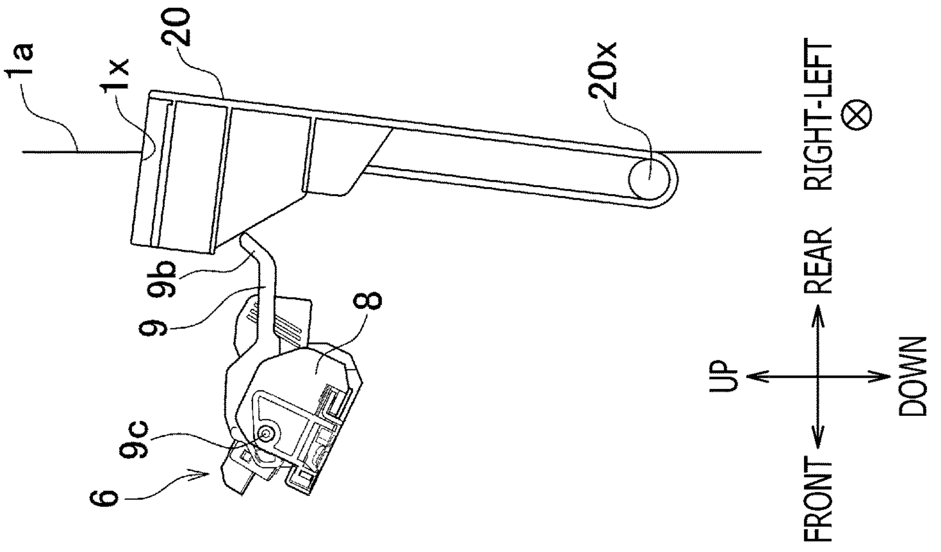
FIG. 9C is a schematic side view showing a state in which the cover moving from the open position toward the closed position is coming into contact with the lever at the releasing position and the lever is about to move from the releasing position to the fixing position.

After the cutter unit 6 is attached to and detached from the carriage, the cover 20 is moved from the open position (see the broken line in FIG. 2) to the closed position (see the solid line in FIG. 2). At this time, if the lever 9 is at the fixing position, the cover 20 can be moved from the open position to the closed position without coming into contact with the lever 9 (see FIG. 9A). However, if the lever 9 is at the releasing position, the cover 20 comes into contact with the lever 9 when moving from the open position toward the closed position and thus cannot be moved to the closed position (see FIG. 9B). Furthermore, if the lever 9 is at the releasing position shown in FIG. 9C (i.e., a position closer to the fixing position than the releasing position shown in FIG. 9B), the cover 20 comes into contact with the rear end 9*b* of the lever 9 and pushes down the rear end 9*b* when the cover 20 moves from the open position to the closed position so that the lever 9 moves from the releasing position to the fixing position. As described above, even when the lever 9 is at the releasing position, there is a case where the cover 20 cannot move to the closed position (see FIG. 9B) and a case where the cover 20 can move to the closed position (see FIG. 9C) depending on a height of the rear end 9*b* of the lever 9.

As described above, according to the present embodiment, by swinging the lever 9 relative to the carriage 8, the lever 9 can be selectively disposed at the fixing position (see FIG. 4A) or the releasing position (see FIG. 4B). The cutter unit 6 can be attached to and detached from the carriage 8 only by swinging the lever 9, and it is not necessary to perform a complicated operation of releasing or re-fixing the cutter unit 6 by rotating a fixing member such as a screw or a bolt. Therefore, the cutter unit 6 can be easily attached to or detached from the carriage 8.

At the fixing position, the lever 9 presses the cutter unit 6 toward the support surface 8*a* against the urging forces of the leaf springs 31 and the coil spring 32 The urging forces act in the direction from the support surface 8*a* toward the cutter unit 6 (See FIGS. 4A and 6). The cutter unit 6 and the carriage 8 can thus be positioned in a direction perpendicular to the support surface 8*a* (i.e., the conveying direction A shown in FIG. 4A).

The leaf springs 31 bias the cutter unit 6 in the direction in which the blade 60*a* of the cutter 60 moves away from the blade 70*a* of the cutter 70 toward the downstream side in the conveying direction A (see FIG. 4B). Thus, the blade 60*a* of the cutter 60 is prevented from coming into contact with the blade 70*a* of the cutter 70 when attaching and detaching the cutter unit 6 to and from the carriage 8.

The scanning mechanism 4 causes the carriage 8 to move from the attaching/detaching position X outside the conveying path T into the conveying path T (see FIG. 3). If the attaching/detaching position X is within the conveying path T, it is difficult to perform the attaching/detaching operation because there are members constituting the conveying path T. In this respect, in the present embodiment, since the attaching/detaching position X is outside the conveying path T, there is no member constituting the conveying path T near the carriage 8 and thus the attaching/detaching operation is easy.

When the controller 100 is receiving the ON signal (a signal indicating that the cutter unit 6 is mounted to the carriage 8) from the mounting sensor S1 (see FIG. 10), the controller 100 controls the conveying motor 3*x* and the driver IC5*x* to execute the recording process of recording an image on the sheet P. Thus, the recording process prevented from being executed in a state where the cutter unit 6 is not mounted to the carriage 8.

Figure 9B:
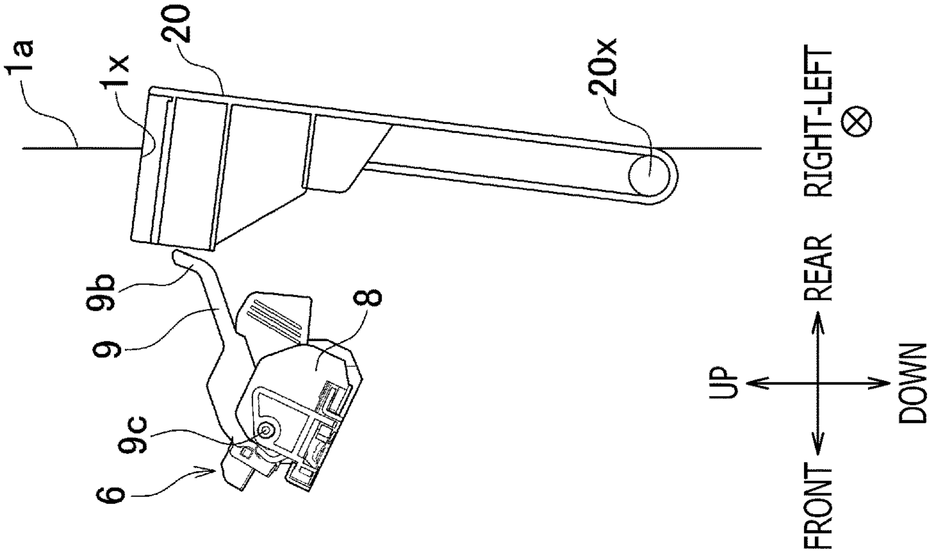
FIG. 9B is a schematic side view showing a state in which the cover is in contact with the lever at the releasing position and cannot move to the closed position.

When the lever 9 is at the releasing position, the cover 20 cannot move to the closed position (see FIG. 9B), and when the lever 9 is in the fixing position, the cover 20 can move to the closed position (see FIG. 9B). According to this configuration, when the cover 20 cannot move to the closed position, the user can recognize that the lever 9 is at the releasing position (i.e., that the cutter unit 6 is not fixed to the carriage 8) and handle appropriately. Therefore, it is possible to suppress execution of the recording process and the like in a state where the lever 9 is at the releasing position and the cutter unit 6 is not fixed to the carriage 8.

Figure 9A:
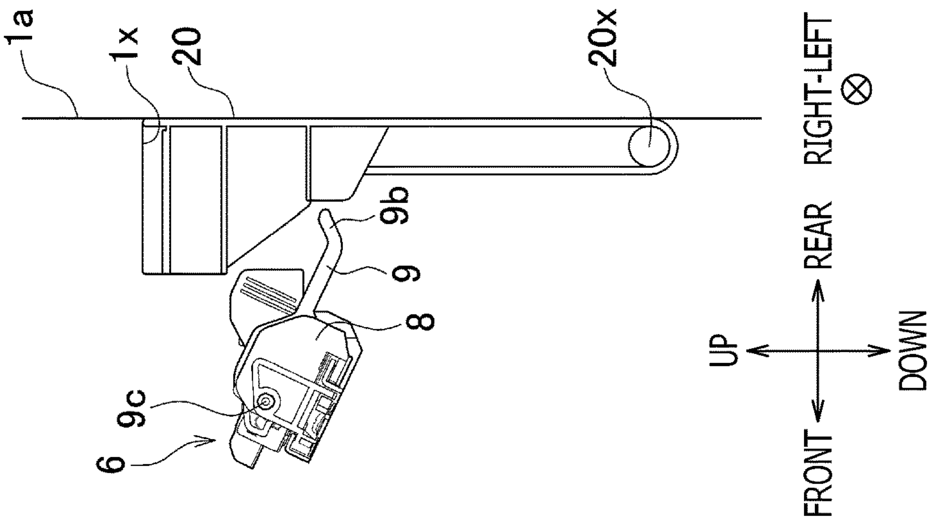
FIG. 9A is a schematic side view showing a state in which the lever is at the fixing position and a cover is at a closed position.

When the cover 20 moves from the open position to the closed position with the lever 9 at the releasing position (see FIG. 9C), the cover 20 comes into contact with the lever 9 to move the lever 9 from the releasing position (see FIG. 9C) to the fixing position (see FIG. 9A). In this case, it is possible to suppress execution of the recording process or the like in a state where the lever 9 is at the releasing position (i.e., in a state where the cutter unit 6 is not fixed to the carriage 8) without the user's additional operation.

A portion of the conveying path T upstream of the head 5 in the conveying direction is formed in the U-shape (see FIG. 2). Accordingly, a planar size of the printer 1 can be reduced. In addition, the cutter unit 6 is provided in the bottom portion Ux of the U-shape portion, and the opening 1*x* that is opened and closed when attaching and detaching the cutter unit 6 is provided at a portion of the housing 1*a* facing the bottom portion Ux, so that the space below the bottom portion Ux can be effectively utilized.

When the controller 100 is receiving the ON signal (i.e., a signal indicating that the cover 20 is at the closed position) from the open/close sensor S2 (see FIG. 10), the controller 100 controls the conveying motor 3*x* and the driver IC 5*x* to execute the recording process of recording an image on the sheet P. This prevents the recording process from being executed in a state where the cover 20 is not in the closed position i.e., in a state where the lever 9 is at the releasing position and the cutter unit 6 is not fixed to the carriage 8).

The projection 61*x* of the cutter unit 6 engages with the recess 8*x* of the carriage 8, and the projections 61*y*1 and 61*y*2 of the cutter unit 6 engage with the holes 8*y*1 and 8*y*2 of the carriage 8 (see FIG. 6). The recess 8*x* and the holes 8*y*1 and 8*y*2 are spaced apart from each other in the first direction D1 along the support surface 8*a*.

The two holes 8*y*1 and 8*y*2 are spaced apart from each other in the second direction D2 (right-left direction) intersecting with the first direction D1 and along the support surface 8*a*. As shown in FIG. 7, the two holes 8*y*1 and 8*y*2 have different widths in the second direction D2 (right-left direction) but has the same width in the first direction D1. Furthermore, the widths of the two holes 8*y*1 and 8*y*2 in the first direction D1 is substantially the same as the widths of the projection 61*y*1 and 61*y*2 in the first direction D1, respectively. Thus, the cutter unit 6 can be positioned with respect to the carriage 8 in the first direction D1. The width of the hole 8*y*1 in the second direction D2 (right-left direction) is substantially the same as the width of the projection 61*y*1 in the second direction D2 (right-left direction). Thus, the cutter unit 6 can be positioned with respect to the carriage 8 in the second direction D2 (right-left direction).

First Modification

Figure 11:
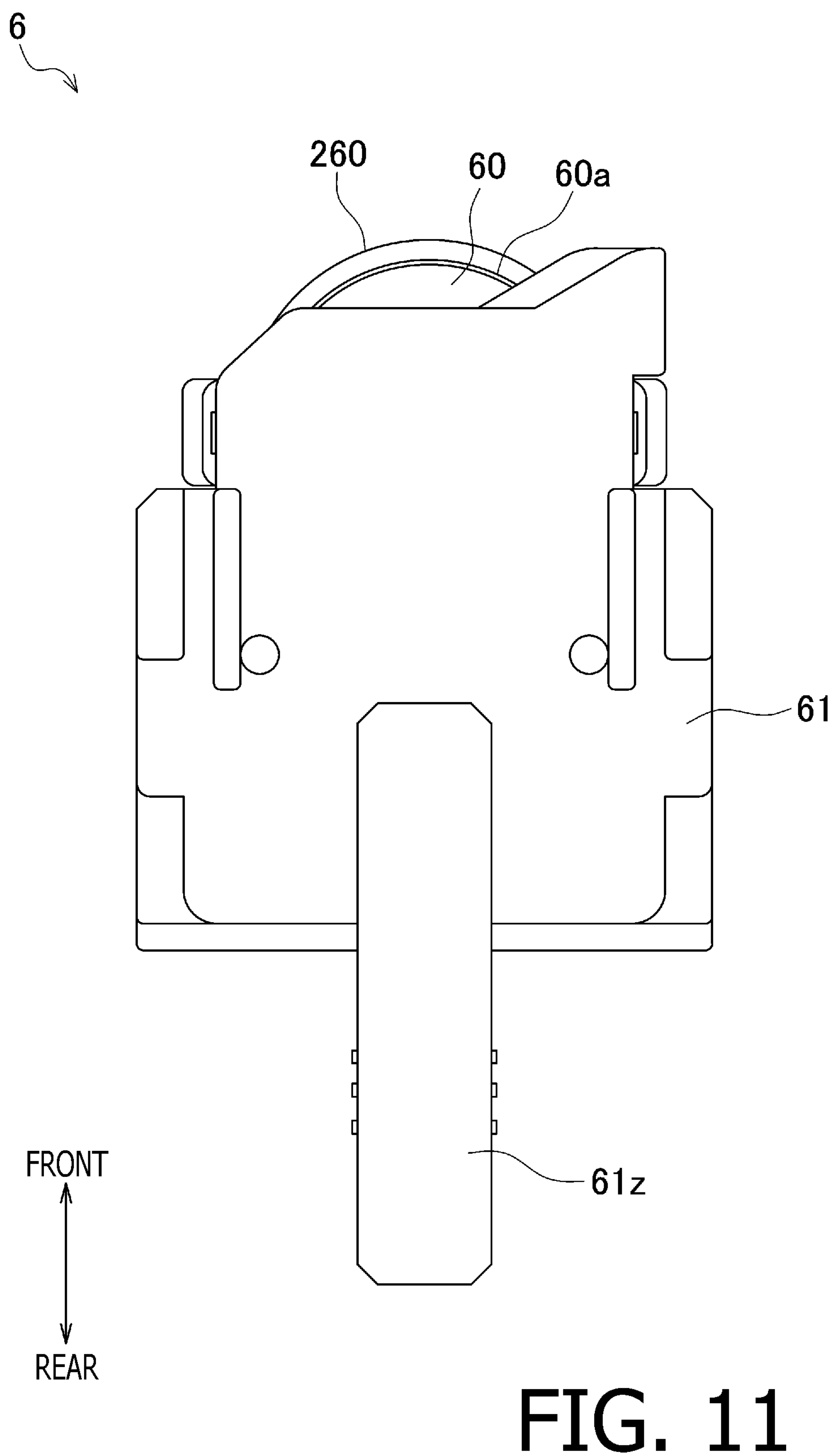
FIG. 11 is a plan view showing another cutter unit.

As shown in FIGS. 11 and 12, a printer according to a first modification differs from the embodiment in that the cutter unit 6 further includes a blade cover 260.

The blade cover 260 has a disc shape with a size slightly larger than the cutter 60, and is disposed on the back side of the cutter 60 (the side facing the cutter 70 in FIG. 4).

Figure 12A:
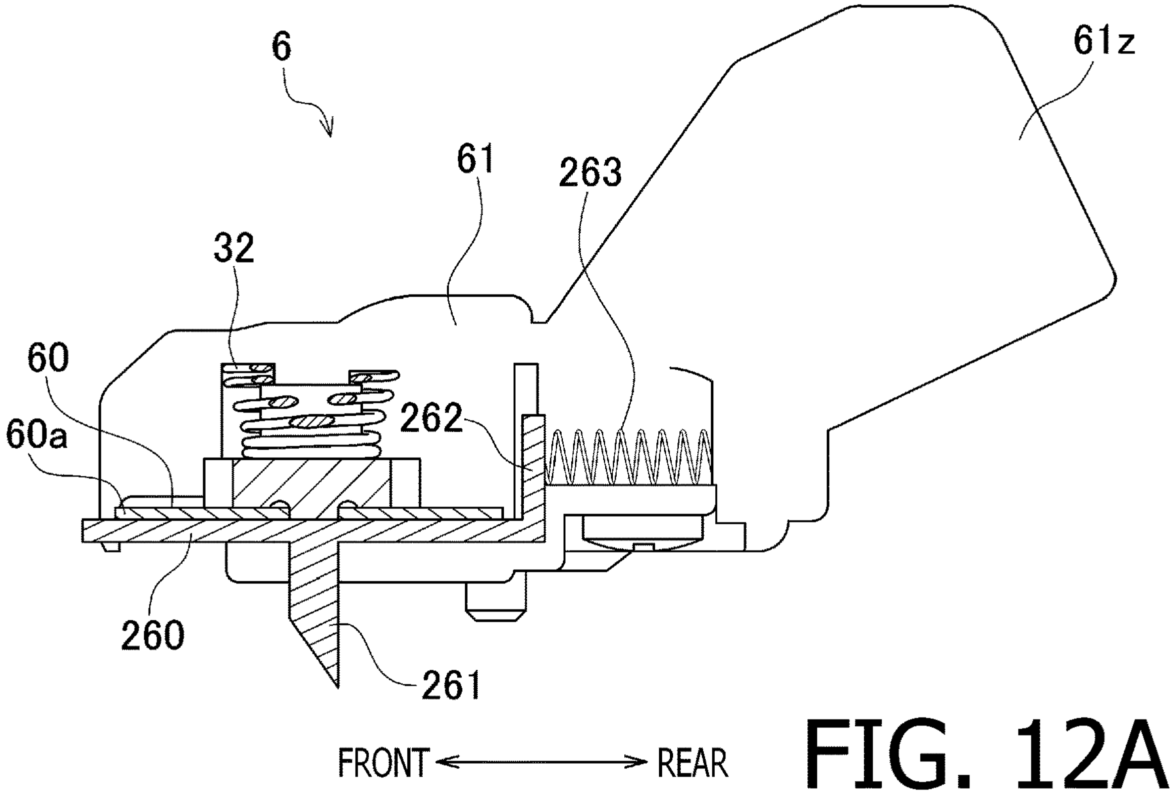
FIG. 12A is a cross-sectional side view of the cutter unit shown in FIG. 11.
Figure 12B:
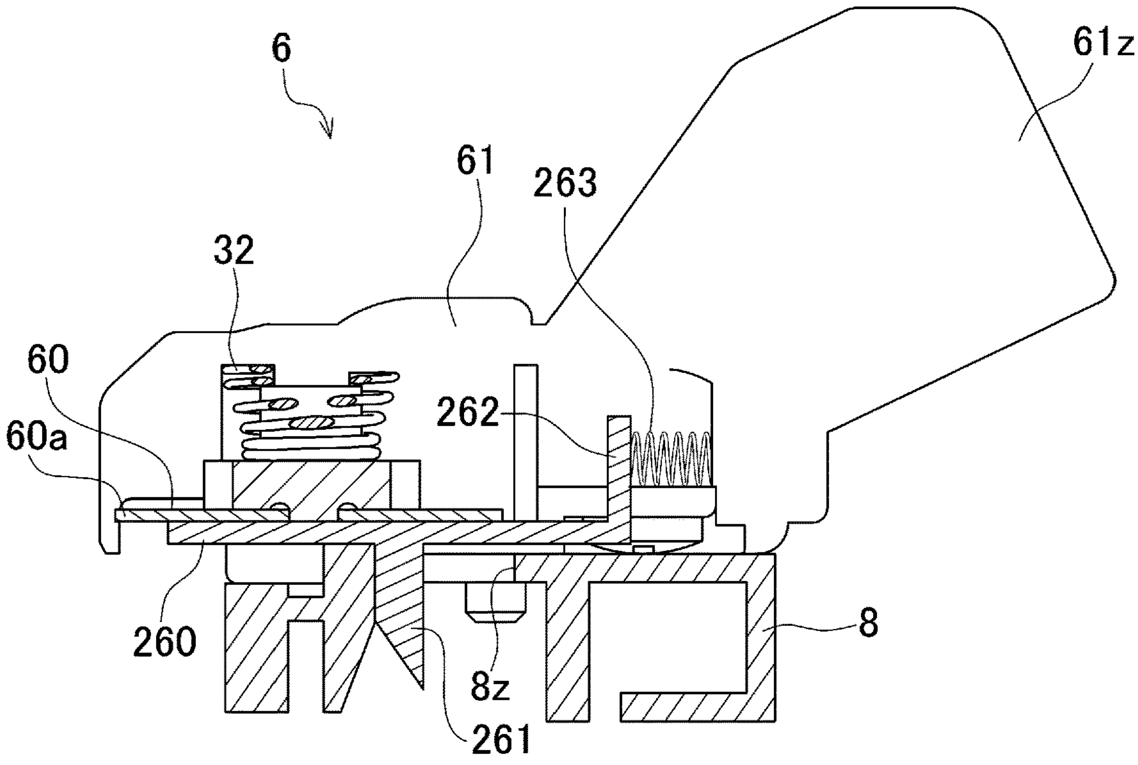
FIG. 12B is a cross-sectional side view showing the cutter unit shown in FIG. 11 attached to the carriage.

As shown in FIGS. 12A and 12B, the blade cover 260 is attached to a rear wall of the holder 61 via a vertical member 262 provided at a rear end of the blade cover 260 and a coil spring 263. The coil spring 263 urges the blade cover 260 forward. A projection 261 is provided on a back surface of the blade cover 260 (a surface of the blade cover 260 opposite to the surface facing the cutter 60).

When the cutter unit 6 is not mounted on the carriage 8, as shown in FIG. 12A, the blade cover 260 is at a covering position for covering the blade 60*a* of the cutter 60. At this time, the blade cover 260 covers the blade 60*a* of the cutter 60 from the back surface side, and a front end of the blade cover 260 is in front of the blade 60*a* of the cutter 60.

When mounting the cutter unit 6 on the carriage 8, as shown in FIG. 12B, the projection 261 is inserted into a hole 8*z* of the carriage 8, and the projection 261 is pushed backward by a peripheral surface defining the hole 8*z* of the carriage 8, so that the coil spring 263 contracts and the vertical member 262 and the blade cover 260 move backward. As a result, the blade cover 260 reaches a non-covering position where the blade cover 260 does not cover the blade 60*a* of the cutter 60. At this time, the front end of the blade cover 260 is behind the blade 60*a* of the cutter 60.

When detaching the cutter unit 6 from the carriage 8, the projection 261 is removed from the hole 8*z* of the carriage 8, and the vertical member 262 and the blade cover 260 moves forward by the urging force of the coil spring 263. As a result, the blade cover 260 moves from a non-covering position where the blade cover 260 does not cover the blade 60*a* of the cutter 60 (see FIG. 12B) to a covering position where the blade cover 260 covers the blade 60*a* of the cutter 60 (see FIG. 12A).

As described above, according to the first modification, by providing the blade cover 260 capable of moving to the covering position (see FIGS. 11 and 12A), it is possible to prevent the user from being injured by the blade 60*a* of the cutter 60 when attaching and detaching the cutter unit 6 to and from the carriage 8.

Second Modification

Figure 13:
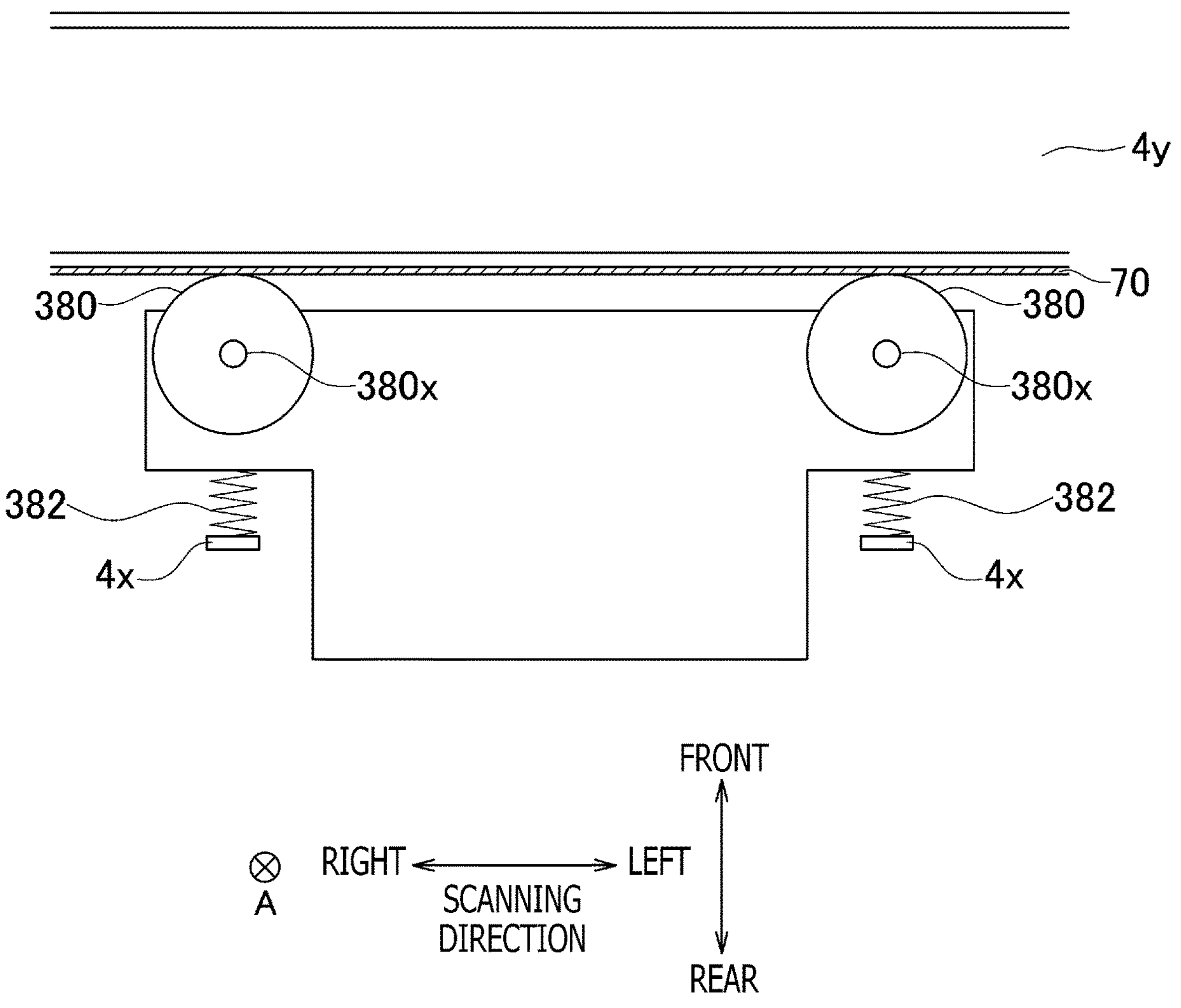
FIG. 13 is a plan view showing a rotating member attached to the carriage.
Figure 14:
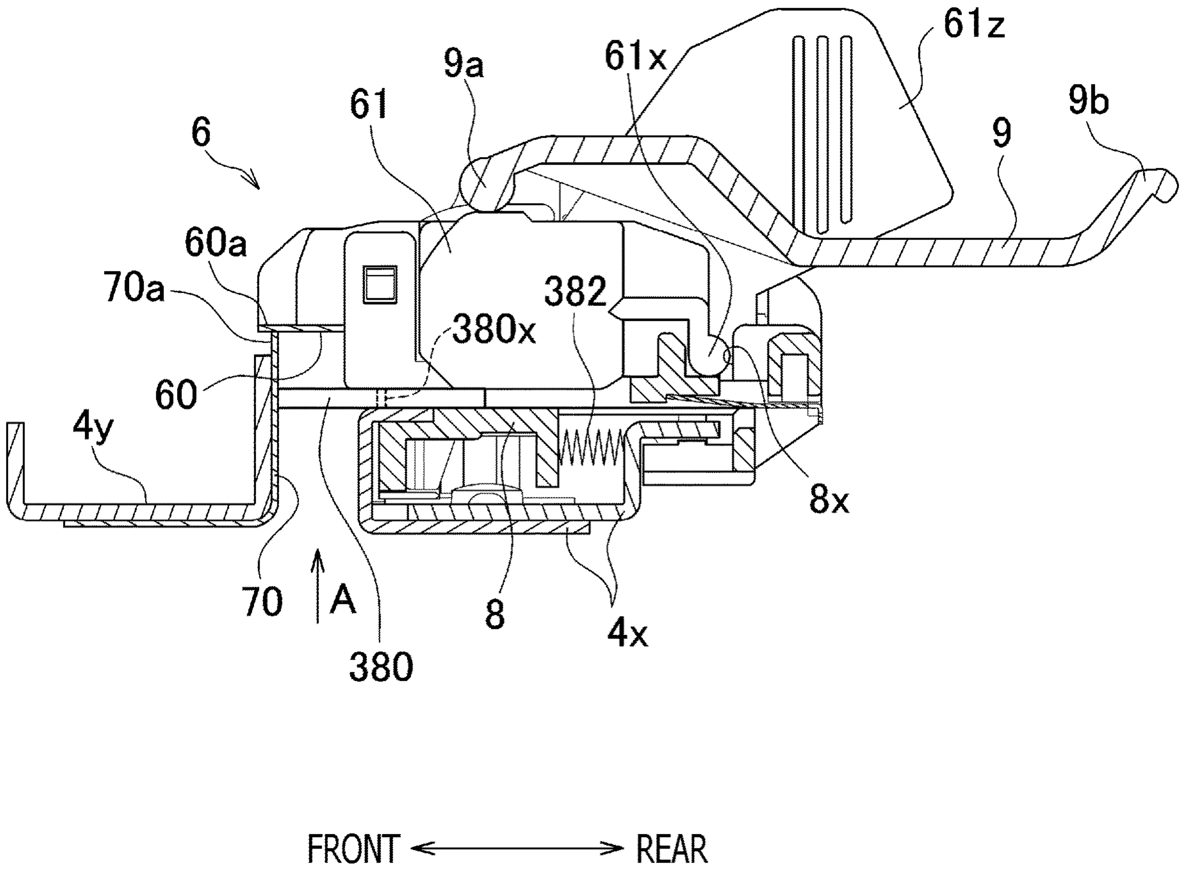
FIG. 14 is a cross-sectional side view showing a state in which a peripheral surface of the rotating member is in contact with another cutter according to a third embodiment of the present invention.

As shown in FIGS. 13 and 14, a printer according to a second modification differs from the embodiment in that two rotating members 380 are attached to the carriage 8.

As shown in FIG. 13, the two rotating members 380 are spaced apart from each other in the scanning direction. As shown in FIGS. 13 and 14, each rotating member 380 is attached to a front end portion of the carriage 8 rotatably about a rotation shaft 380*x* extending along the conveying direction A, and projects forward from a front end surface of the carriage 8. The carriage 8 is attached to the guide rail 4*x* via coil springs 382 provided behind respective rotating members 380, and is urged forward by the coil springs 382. The coil springs 382 urge the rotating member 380 forward toward the cutter 70.

When the carriage 8 is caused to move in the scanning direction by the scanning mechanism 4 (see FIG. 3), each rotating member 380 rotate while bringing its peripheral surface into contact with the cutter 70. At this time, each rotating member 380 is urged forward by the coil spring 382, so that the peripheral surface of the rotating member 380 is kept in contact with the cutter 70.

As described above, according to the second modification, since the rotating members 380 and the coil springs 382 are provided, when the carriage 8 moves in the scanning direction, the state in which the peripheral surfaces of the rotating members 380 are in contact with the cutter 70 is maintained (see FIG. 13). Accordingly, a positional relationship between the blade 60*a* of the cutter 60 and the blade 70*a* of the cutter 70 in the front-rear direction (see FIG. 14) can be kept constant, and the cutting accuracy can be kept constant at a suitable level.

Two rotating members 380 spaced apart from each other in the scanning direction are provided (see FIG. 13). As a result, the positional relationship between the blade 60*a* of the cutter 60 and the blade 70*a* of the cutter 70 in the front-rear direction (see FIG. 14) can be more reliably kept constant.

Further Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment and modifications, the cutter 60 included in the cutter unit 6 is disk-shaped and is configured to rotate. However, a fixed cutter such as the one used for the cutter 70 may be used as the cutter 60.

Although the cutter 70 in the above-described embodiment and modifications is fixed, a disk-shaped rotating cutter such as the one used for the cutter 60 may be used as the cutter 70.

The opening 1*x* and the cover 20 are provided on the rear surface of the housing in the above-described embodiment and modifications, but may be provided on the front surface, side surface, upper surface, or the like of the housing. For example, in a configuration in which the sheet P is fed forward from the sheet feed tray 10, conveyed upward at the bottom portion of the U-shaped portion, and then conveyed backward toward the head 5, the opening and the cover may be provided on the front surface of the housing.

The sheet P is not limited to paper, but may be cloth or plastic film. In other words, the sheet P may be made of any material as long as it is sheet-like.

The head 5 may discharge liquid other than ink (e.g., a treatment liquid for aggregating or precipitating components in the ink). The head 5 not limited to a liquid discharge system, and may be a laser system, a thermal transfer system, or the like.

Aspects of the present disclosure may be applied not only to a printer but can also to a facsimile machine, a copy machine, a multi-function machine, and the like.

The sheet P is an example of a "sheet-like medium" according to aspects of the present disclosure. The head 5 is an example of a "recorder" according to aspects of the present disclosure. The mounting sensor S1 is an example of a "first sensor" according to aspects of the present disclosure. The ON signal outputted by the mounting sensor S1 is an example of a first detection signal. The open/close sensor S2 is an example of a "second sensor" according to aspects of the present disclosure. The ON signal outputted by the open/close sensor S2 is an example of a second detection signal. A pair of leaf springs 31 is an example of a "biasing member" according to aspects of the present disclosure). The projection 61*x* is an example of a "third engaging portion" according to aspects of the present disclosure. The two projections 61*y*1 and 61*y*2 are examples of a "fourth engaging portion" according to aspects of the present disclosure. The coil spring 32 is an example of a "biasing member" according to aspects of the present disclosure. The coil springs 382 are examples of "another urging member" according to aspects of the present disclosure.

What is claimed is:

1. An image recording apparatus comprising:

a conveyer configured to convey a sheet-like medium in a conveying direction along a conveying path;

a recorder configured to record an image on the sheet-like medium conveyed by the conveyer;

a cutter unit including a cutter and configured to cut the sheet-like medium in the conveying path;

a carriage to which the cutter unit is detachably attached;

a shaft fixed to the carriage; and a lever fixed to the shaft such that the lever is swingably attached to the carriage, wherein the lever is configured to swing between a fixing position for fixing the cutter unit to the carriage and a releasing position for releasing the fixing of the cutter unit to the carriage.

2. The image recording apparatus according to claim 1, further comprising a biasing member configured to generate a biasing force that pushes the cutter unit away from a support surface of the carriage supporting the cutter unit, wherein, when at the fixing position, the lever presses the cutter unit toward the support surface against the biasing force.

3. The image recording apparatus according to claim 2, further comprising another cutter extending along the conveying path and having a blade at an end on the downstream side in the conveying direction, wherein a blade of the cutter extends in a direction intersecting the sheet-like medium lying along the conveying path downstream of a blade of the other cutter in the conveying direction when the lever is at the fixing position, and overlaps with the blade of the other cutter in the conveying direction, and wherein the urging member urges the cutter unit in a direction in which the blade of the cutter moves away from the blade of the other cutter toward a downstream side in the conveying direction.

4. The image recording apparatus according to claim 3, further comprising a blade cover configured to move between a covering position where the blade cover covers the blade of the cutter when the cutter unit is not mounted to the carriage, and a non-covering position where the blade cover does not cover the blade of the cutter when the cutter unit is mounted to the carriage.

5. The image recording apparatus according to claim 3, further comprising:

a scanning mechanism configured to cause the carriage to move in a scanning direction parallel to the sheet-like medium lying along the conveying path and intersecting with the conveying direction;

a rotating member attached to the carriage and configured to rotate when a peripheral surface thereof is in contact with the other cutter and the carriage moves in the scanning direction by the scanning mechanism; and another biasing member configured to bias the rotating member toward the other cutter.

6. The image recording apparatus according to claim 5, further comprising a plurality of the rotating members spaced apart from each other in the scanning direction.

7. The image recording apparatus according to claim 5, wherein the scanning mechanism causes the carriage to move from an attaching/detaching position outside the conveying path into the conveying path.

8. The image recording apparatus according to claim 7, further comprising:

a first sensor provided at the attaching/detaching position and configured to output a first detection signal indicating that the cutter unit is mounted to the carriage; and a controller electrically connected to the first sensor and which, when the first detection signal is received from the first sensor, controls the conveyer and the recorder to execute a recording process of recording an image on the sheet-like medium.

9. The image recording apparatus according to claim 1, further comprising:

a housing in which the carriage is provided;

an opening formed to the housing and which exposes the carriage to the outside of the housing; and a cover movable relative to the housing and configured to move between a closed position for closing the opening and an open position for opening the opening, wherein the lever contacts the cover to prevent the cover from moving to the closed position when the lever is at the releasing position, and the lever does not contact the cover at any position when the lever is at the fixing position.

10. The image recording apparatus according to claim 1, further comprising:

a housing in which the carriage is provided;

an opening formed to the housing in which exposes the carriage to the outside of the housing; and a cover movable relative to the housing and configured to move between a closed position for closing the opening and an open position for opening the opening, wherein, when the cover moves from the open position to the closed position with the lever at the releasing position, the cover comes into contact with the lever to move the lever from the releasing position to the fixing position.

11. The image recording apparatus according to claim 9, wherein the conveying path includes a U-shaped portion at a portion upstream of the recorder in the conveying direction, wherein the cutter unit is disposed at a bottom portion of the U-shaped portion, and wherein the opening is formed at a portion of the housing facing the bottom portion.

12. The image recording apparatus according to claim 9, further comprising:

a second sensor configured to output a second detection signal indicating that the cover is at the closed position; and a controller electrically connected to the second sensor and which, when the second detection signal is received from the second sensor, controls the conveyer and the recorder to execute a recording process of recording an image on the sheet-like medium.

13. The image recording apparatus according to claim 1 wherein the carriage includes a first engaging portion and a second engaging portion spaced apart from the first engaging portion in a first direction along a support surface of the carriage configured to support the cutter unit, and the cutter unit includes a third engaging portion configured to engage with the first engaging portion and a fourth engaging portion configured to engage with the second engaging portion.

14. The image recording apparatus according to claim 13, wherein:

the carriage has two second engaging portions spaced apart from each other in a second direction intersecting with the first direction and along the support surface;

the cutter unit has two fourth engaging portions spaced apart from each other in the second direction;

either of the second engaging portions and the fourth engaging portions are holes;

the other of the second engaging portions and the fourth engaging portions are projections to be inserted into the holes; and the lengths of the two holes in the second direction are different from each other.

15. The image recording apparatus according to claim 1, wherein the lever includes the shaft.

* * * * *